No. 882,698. PATENTED MAR. 24, 1908.
E. LAHL.
NAIL PICK-UP DEVICE.
APPLICATION FILED MAY 13, 1907.
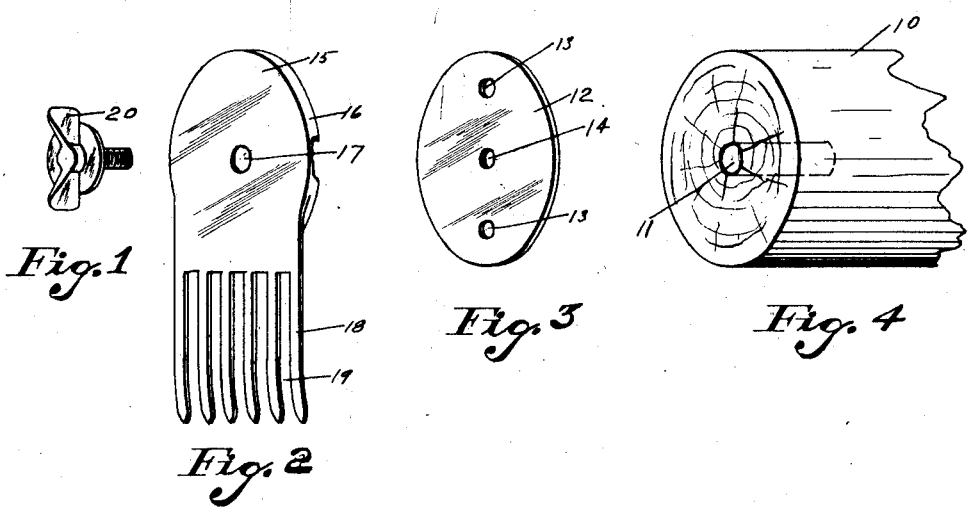
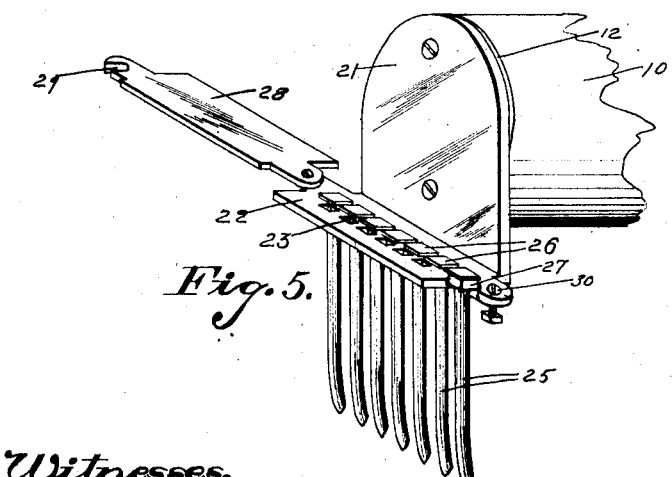
Witnesses.
P. H. Decker.
F. C. Dahlberg.
Inventor.
Edward Lahl.
By Orwig & Lane Attorneys.

UNITED STATES PATENT OFFICE.

EDWARD LAHL, OF SAN FRANCISCO, CALIFORNIA.

NAIL-PICK-UP DEVICE.

No. 882,698.　　　Specification of Letters Patent.　　Patented March 24, 1908.

Application filed May 13, 1907. Serial No. 373,462.

*To all whom it may concern:*

Be it known that I, EDWARD LAHL, a citizen of the United States, residing at San Francisco, in the county of San Francisco and State of California, have invented a certain new and useful Nail-Pick-Up Device, of which the following is a specification.

The object of my invention is to provide a device to be used in the nature of an attachment to a hammer, hatchet or similar instrument for the purpose of picking up nails so that the operator may grasp a hand full of them, all arranged with the heads uppermost, to thereby save the operator the time and annoyance required in selecting nails from a package containing them and turning the heads in the direction required for quick and effective use.

A further object is to provide a device of this kind that may be quickly and easily attached to and detached from the instrument with which it is connected.

A further object is to provide a device of this kind that may be quickly and easily adjusted by the operator to work effectively in connection with nails of different sizes and shapes.

My invention consists in certain detail in the construction arrangement and combination of the various parts of the device, whereby the objects contemplated are attained as hereinafter more fully set forth, pointed out in my claims, and illustrated in the accompanying drawings in which, Figures 1, 2, 3, & 4 illustrate, in perspective, the screw for connecting the picking up device to a handle, the body of the pick up device, the plate to be permanently connected to an implement handle and the implement handle having an opening in it to receive the screw. Fig. 5 shows a perspective view of a modification attached to a part of an implement handle with a series of detachable tines in position therein.

Referring to the accompanying drawings I have used the reference numeral 10 to indicate the handle of a hammer or other implement having formed therein an opening 11. In order to provide for connecting the nail pick up device with this handle I provide a plate 12 of the same shape in outline as the end of the handle. This plate is provided with openings 13 to receive screws for permanently attaching the plate to the handle and it is also provided with a central screw threaded opening 14, to stand in line with the opening 11 of the handle.

The body of the pick-up device is indicated by the numeral 15, and is provided with a flange 16, designed to overlap and inclose the plate 12. It is also provided with a central opening 17 in line with the opening 14. At one side of the body portion 15 I have formed a number of tines 18 with spaces 19 between them. The outer ends of these tines are preferably curved slightly towards the handle of the tool to which this pick up device is attached.

The reference numeral 20 indicates a thumb screw of ordinary construction designed to be placed through the opening 17 and seated in the screw threaded opening 14, whereby the plate 15 may be detachably connected with the plate 12. The flange being fitted to plate 12 which is preferably oval in outline, provides for preventing a rotary movement of the body portion 15 relative to the implement handle. In the modified form shown in Fig. 6, I have shown the body portion of the pick up device which is indicated by the numeral 21, said body portion having at one side a right angled plate 22 having two series of rectangular openings 23, the openings of one series being closer together than those on the other. These openings are designed to receive tines, each of which comprises a body portion 25, a flat head 26 and a rectangular shoulder 27 designed to fit into the rectangular opening 23, pivoted to the part 22 is a retaining plate 28 having a notch 29 therein designed to receive a screw 30 by which the plates 22 and 28 may be clamped together.

In the modified form shown in Fig. 5, I have shown cross head 31 having at one side a screw threaded extension 32 and at another side a series of tines 33.

In practical use and assuming the pick up device to be connected with a hammer handle or the like, the operator grasps the hammer handle and inserts the tines of the pick up device into a package or receptacle containing the quantity of nails. He uses the pick up device in the nature of a rake and thus causes the tines thereof to engage the nails and those nails that are engaged with the heads in one direction will be retained by the tines and those that are engaged with the heads in the other direction will slip through the tines, so that after one or two movements of the pick up device through the nails, all of the spaces between the tines will be filled with nails hanging from the pick up device with their heads uppermost, then the operator may grasp the body portion of the nails thus held and jointly withdraw them from the pick up device, leaving the nails in the hand all with the heads uppermost.

With the modified form of the device shown in Fig. 6, the operator may adapt the pick up device for use in connection with either large or small nails, by simply removing the tines from the row of openings in which they are passed and placed then placing them in the other row of openings, then the retaining plate 28 may be returned to position to hold the heads of the tines firmly in place.

Having thus described my invention, what I claim and desire to secure by Letters Patent of the United States, therefore is,

1. A nail pick up device comprising a body portion having a flange designed to receive the end of a tool handle, and having an opening therein to receive a screw for connecting said body portion with the tool handle, and a series of tines fixed to one edge of said body portion, and having spaces between them.

2. A nail pick up device, comprising a body portion having an extension thereon formed with two rows of openings, the openings in one row being spaced apart further than those in the other row, a series of tines placed in one of said rows of openings and capable of being removed and replaced in the other row of openings and a hinged retaining plate designed to securely hold said tines in position.

Des Moines, Iowa, April 27, 1907.

EDWARD LAHL.

Witnesses:
THOMAS CECIL,
FANNIE CECIL.